(12) United States Patent
Dufrene (10) Patent No.: US 8,744,363 B2
(45) Date of Patent: Jun. 3, 2014

(54) CANCELLATION OF RF SECOND-ORDER INTERMODULATION DISTORTION

(75) Inventor: Krzysztof Dufrene, Plesching (AT)

(73) Assignee: Intel Mobile Communications GmbH, Neubiberg (DE)

( * ) Notice: Subject to any disclaimer, the term of this patent is extended or adjusted under 35 U.S.C. 154(b) by 196 days.

(21) Appl. No.: 13/396,012

(22) Filed: Feb. 14, 2012

(65) Prior Publication Data

US 2013/0208631 A1 Aug. 15, 2013

(51) Int. Cl.
*H04B 1/00* (2006.01)
*H04B 1/16* (2006.01)

(52) U.S. Cl.
USPC ........................... 455/63.1; 455/296; 455/325

(58) Field of Classification Search
USPC ............. 455/63.1, 295, 296, 323, 324, 189.1, 455/325, 333
See application file for complete search history.

(56) References Cited

U.S. PATENT DOCUMENTS

| | | | | |
|---|---|---|---|---|
| 2007/0049215 | A1* | 3/2007 | Chen et al. | 455/86 |
| 2009/0181633 | A1* | 7/2009 | Molnar et al. | 455/317 |
| 2009/0325518 | A1* | 12/2009 | Mattisson et al. | 455/131 |
| 2010/0159858 | A1* | 6/2010 | Dent et al. | 455/131 |
| 2011/0128992 | A1 | 6/2011 | Maeda et al. | |
| 2011/0195673 | A1* | 8/2011 | Pratt et al. | 455/78 |
| 2012/0027137 | A1* | 2/2012 | Molnar et al. | 375/346 |
| 2012/0077453 | A1* | 3/2012 | Ahrari et al. | 455/341 |
| 2012/0140685 | A1* | 6/2012 | Lederer et al. | 370/286 |
| 2012/0282374 | A1* | 11/2012 | Stillman | 426/66 |
| 2013/0149981 | A1* | 6/2013 | Myers | 455/234.1 |
| 2013/0155911 | A1* | 6/2013 | Kahrizi et al. | 370/277 |

FOREIGN PATENT DOCUMENTS

DE 102004063722 A1 8/2005

OTHER PUBLICATIONS

U.S. Appl. No. 13/372,913, filed Feb. 14, 2012.
Non-Final Office Action dated Feb. 5, 2014 for U.S. Appl. No. 13/372,913. 15 Pages.

* cited by examiner

*Primary Examiner* — Andrew Lee
(74) *Attorney, Agent, or Firm* — Eschweiler & Associates, LLC (57) ABSTRACT

The disclosed invention relates to a transceiver system configured to cancel RF second-order intermodulation distortion (IMD2) within a differential reception path. In some embodiments, the transceiver system has one or more common-mode attenuation elements that attenuate common-mode interferer signals within the differential reception path. The common-mode attenuation elements detect a common-mode interferer from one or more nodes within a transceiver system frontend. One or more properties of the detected common-mode interferer are adjusted and then fed into the differential reception path, where the adjusted common-mode signal attenuates the common-mode interferers. In other embodiments, the differential reception path has a tunable amplifying stage. The tunable amplifying stage has first and second amplifier elements that are independently operated to intentionally introduce an operating parameter mismatch between the elements. The intentional mismatch may be tuned to account for different nonlinear responses of the amplifier elements to mitigate IMD2 within the differential reception path.

20 Claims, 9 Drawing Sheets

CANCELLATION OF RF SECOND-ORDER INTERMODULATION DISTORTION

BACKGROUND

Many modern wireless communication devices (e.g., cell phones, PDAs, etc.) utilize transceivers having both a transmitter section (i.e., transmission chain) configured to transmit data and a receiver section (i.e., receiver chain) configured to receive data over radio frequencies.

Figure 1A:
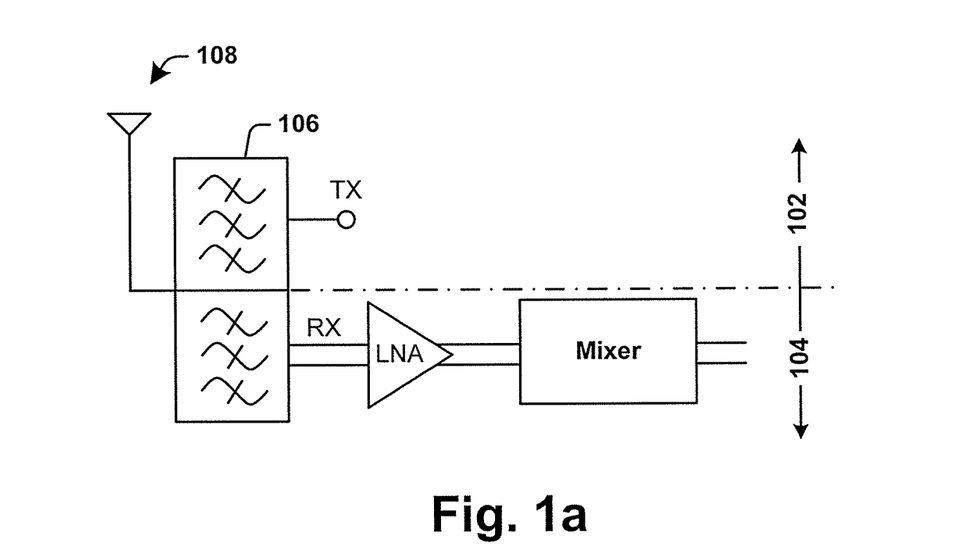
FIG. 1a illustrates a block diagram of a transceiver system with second-order intermodulation distortion in the reception path.

For example, FIG. 1a illustrates a wireless communication transceiver 100 comprising a transmitter section 102 and a receiver section 104. In order to reduce the hardware used by transceiver 100, a duplexer 106 may be configured to couple both transmitter section 102 and receiver section 104 to a common antenna 108. To achieve high data rates, transceiver 100 may be configured to operate in full-duplex mode, wherein both transmitter section 102 and receiver section 104 use antenna 108 at the same time. During full-duplex mode operation, transmitter section 102 typically uses one carrier frequency while receiver section 104 uses another carrier frequency.

Despite using different frequencies, intermodulation distortion may arise during operation of transceiver 100. Intermodulation distortion occurs when a modulated blocker passes a component with a nonlinear characteristic, forming a spurious signal (e.g., an additional signal at a frequency that are not at harmonic frequencies of a received signal, but are instead at a sum and difference of the original signal frequency) in a reception path that interferes with a received differential input signal.

Figure 1B:
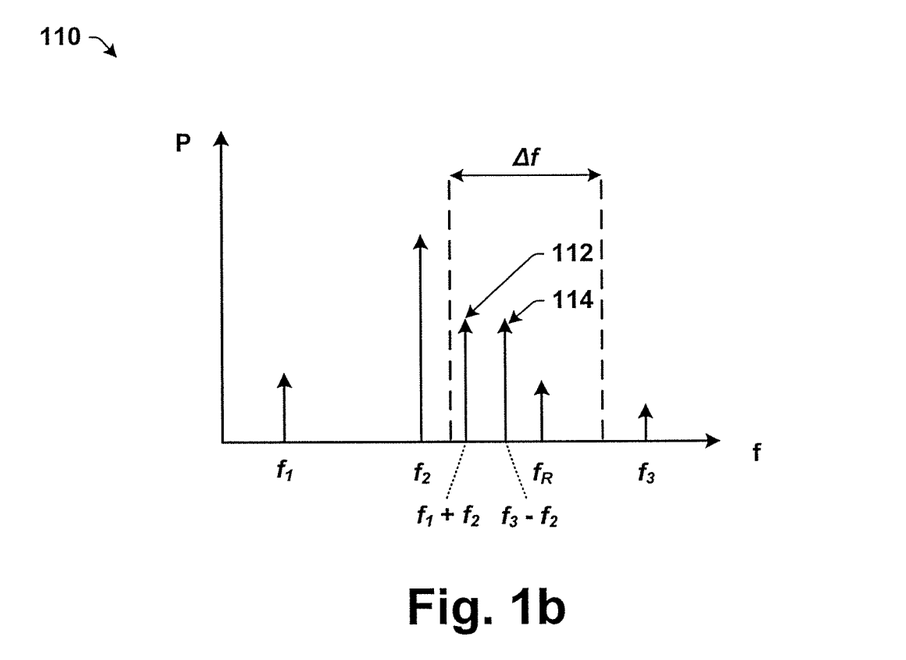
FIG. 1b is a graph showing the effect of second-order intermodulation distortion within the frequency domain.

Second-order intermodulation distortion is caused by multiplication of two interferer signals. FIG. 1b illustrates a frequency graph 110 showing an RF second-order intermodulation distortion (i.e., second order intermodulation distortion at RF frequencies) generated by interferer signals. As illustrated in graph 110, the frequency domain comprises a plurality of interferer signals at frequencies f1, f2, and f3. Although the frequencies of the interferer signals are not close to a received differential input signal frequency $f_R$, the interferer signals may combine together to form spurious signals, 112 and 114, comprising products having a sum or difference of their frequencies (e.g., f1+f2, f3−f2). Spurious signals that land at an RF frequency occupied by received differential input signal frequency $f_R$ cause second-order intermodulation distortion that is detrimental to operation of the transceiver system. Once intermodulation distortion appears within the reception path, there is no way of distinguishing it from the desired signal and transceiver sensitivity is degraded.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

It will be appreciated that "RF second-order intermodulation distortion" is second-order intermodulation distortion that is specifically located at an RF frequency (e.g., that is present in a receiver path before downconversion). This is in contrast to baseband (BB) second-order intermodulation noise, which is a distortion that is present at low, baseband frequencies (i.e., which deteriorates RX performance after downconversion). The disclosed apparatus and techniques disclosed herein relate to mitigation of RF second-order intermodulation noise.

RF intermodulation distortion typically occurs when a transmitted signal leaks into a reception path due to limited isolation provided by a duplexer. However, even modern duplexers that offer good isolation do so at the expense of a common-mode interferer component being fed to the reception path. Filters may be used to remove unwanted interferers from the reception path. However, such filtering is expensive to implement in products. Furthermore, if the filtering is not highly selective, interferers with considerable levels may still appear within the reception path. For example, as shown in graph 110, the frequency domain may be filtered, but still pass a frequency range Δf that includes a differential input signal and close by spurious signals.

The inventors have appreciated that there are two major mechanisms that contribute to RF second-order intermodulation distortion in differential transceiver systems. The first mechanism is mismatches between transistor devices in nonlinear RF amplifiers. In particular, there are operational mismatches between amplifier elements configured to amplify each of the two differential branches in a differential reception path. The operational mismatches lead to different nonlinear responses between the two differential branches and thus to RF second-order intermodulation distortion.

Figure 1C:
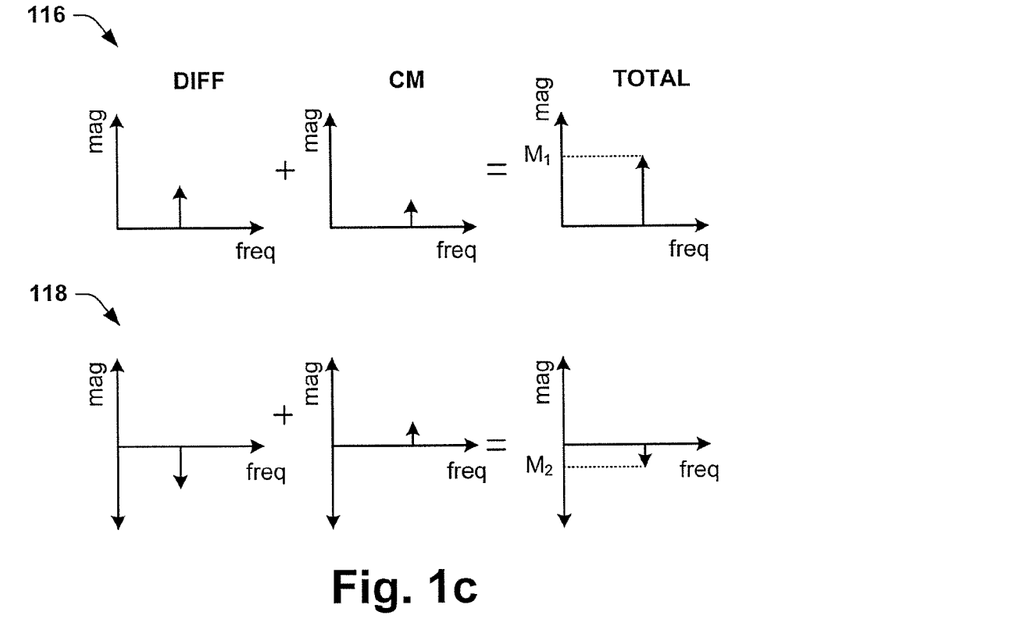
FIG. 1c shows graphs illustrating the effect of common-mode interferers on a received differential input signal.

The second mechanism is the common-mode components of interferer signals. The common-mode components of interferer signals may cause problems when the interferer signals are processed alongside of a wanted differential input signal. For example, FIG. 1c illustrates the influence of a common-mode interferer signal on a total input signal for two differential branches in a reception path. A first differential branch 116 comprises an input signal having differential (DIFF) components, which are in phase with an interferer signal having common-mode (CM) components (i.e., a common-mode interferer signal). The resulting "total" signal has a first magnitude $M_1$ equal to the sum of the differential and common-mode components. A second differential branch 118 comprises an input signal having differential (DIFF) components that are out of phase with a common-mode interferer signal. The resulting "total" signal has a second magnitude $M_2$ that is different than magnitude $M_1$, causing different second-order intermodulation distortion responses even when applied to a perfectly matched differential nonlinear amplifier in the reception path.

Accordingly, a transceiver system configured to cancel RF second-order intermodulation distortion is provided herein. The disclosed transceiver system is configured to cancel RF second-order intermodulation distortion arising from at least one of the two above identified mechanisms that contribute to RF second-order intermodulation distortion in differential transceiver systems.

In some embodiments, the transceiver system comprises a reception path having a tunable amplifying stage comprising first and second amplifier elements configured to respectively amplify differential components of a received differential input signal. The first and second amplifier elements are independently operated to intentionally introduce an operating parameter mismatch (e.g., a gain coefficient mismatch) between the first and second amplifier elements having a specific value. The intentional operating parameter mismatch may be tuned to account for different nonlinear responses of the two amplifier elements so as to mitigate RF second-order intermodulation distortion within the reception path.

In other embodiments, the transceiver system may additionally or alternatively comprise one or more common-mode attenuation elements. The common-mode attenuation elements are configured to attenuate common-mode interferer signals within the differential reception path. In particular, the common-mode attenuation elements are configured to detect a common-mode interferer signal from one or more nodes within a front end of the transceiver system. One or more properties of the detected common-mode interferer signals are adjusted and then the adjusted common-mode signal is fed back into the reception path, where the adjusted common-mode signal attenuates the common-mode interferer signals without substantially deteriorating a received differential input signal.

Figure 2:
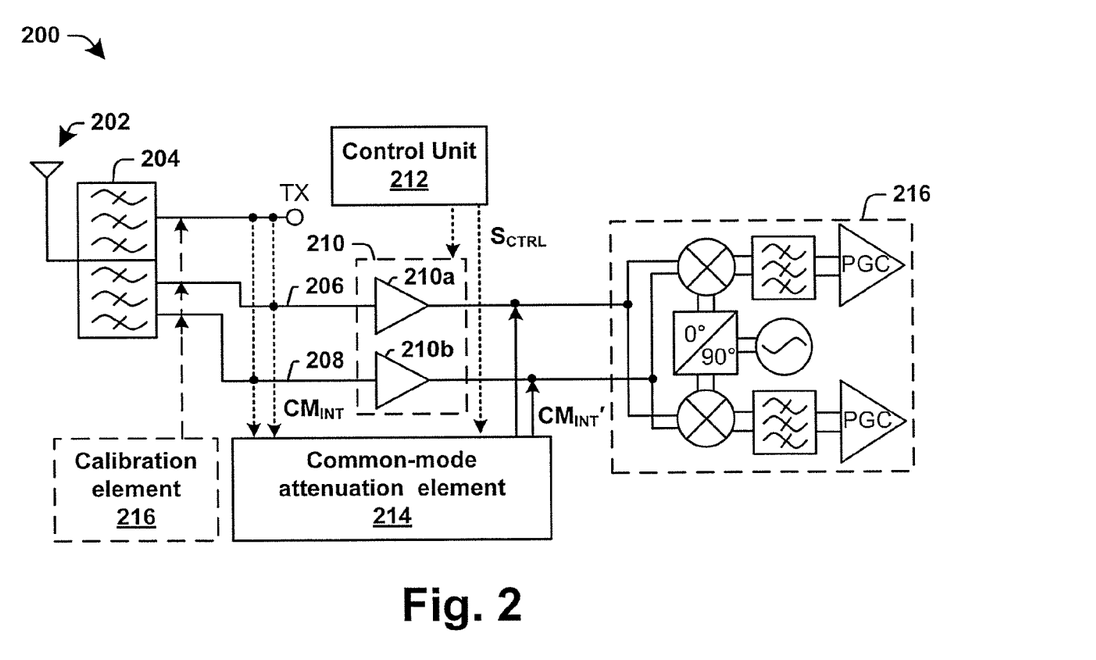
FIG. 2 illustrates a block diagram of an exemplary transceiver system configured to attenuate RF second-order intermodulation distortion within a reception path.

FIG. 2 illustrates an exemplary block diagram of a front end of a transceiver system 200 configured to mitigate RF second-order intermodulation distortion within a reception path.

Transceiver system 200 comprises a transmission path and a reception path. The transmission path is configured to provide a transmitted signal TX to an antenna 202 by way of a duplexer 204. The reception path is configured to receive an RF input signal from antenna 202. The RF input signal is provided to duplexer 204, which outputs a differential input signal along first and second differential branches, 206 and 208 respectively, of the reception path.

A nonlinear tunable amplifying stage 210 is configured to receive the differential input signal from duplexer 204. Tunable amplifying stage 210 comprises a first amplifier element 210a and a second amplifier element 210b. First and second amplifier elements, 210a and 210b, are configured to separately amplify components of the differential input signal before it is demodulated by a downstream mixer 216. For example, first amplifier element 210a is configured to amplify components of the differential input signal on the first differential branch, while second amplifier element 210b is configured to amplify components of the differential input signal on the second differential branch.

A control unit 212 is configured to provide control signals $S_{CTRL}$ to at least one of amplifier elements 210a and 210b. The control signals $S_{CTRL}$ independently control operating parameters of amplifier elements 210a or 210b. In some embodiments, control unit 212 is configured to provide a control signal to one of amplifier elements 210a and 210b. In some alternative embodiments, control unit 212 is configured to provide a first control signal to first amplifier element 210a and a different, second control signal to second amplifier element 210b.

By independently controlling amplifier elements 210a and 210b, which separately amplify different components of the differential input signal, an intentional mismatch in operating parameters of amplifier elements 210a and 210b may be introduced. The intentional operating parameter mismatch may be chosen to have a specific value (e.g., a relative gain coefficient mismatch factor) that accounts for mismatches between transistor devices within amplifier elements 210a and 210b. By accounting for mismatches between transistor devices within amplifier elements 210a and 210b, the nonlinear response of two differential branches may be reduced, thereby reducing RF second-order intermodulation noise. In some embodiments, the operating parameter mismatch may comprise a mismatch in gain (i.e., gain coefficients) of first and second amplifier elements 210a and 210b, for example.

Transceiver system 200 may alternatively or additionally comprise one or more common-mode attenuation elements 214. The common-mode attenuation elements 214 are configured to detect common-mode interferer signal(s) $CM_{INT}$ from one or more independent nodes in the front-end of transceiver system 200 (e.g., the transmit path or input of amplifying stage 206). One or more properties of the detected common-mode interferer signal(s) are adjusted (e.g., magnitudes, phases, group delays, etc.) to form an adjusted common-mode signal $CM_{INT}'$ that is fed back into the reception path. Since the adjusted common-mode signal $CM_{INT}'$ is based upon the detected common-mode interferer signal $CM_{INT}$ it may attenuate the common-mode interferer signal $CM_{INT}$ without affecting the differential input signal received from antenna 202.

In some embodiments, the adjusted common-mode signal $CM_{INT}'$ may be fed back into the reception path at a downstream location. It will be appreciated that the term "downstream location" refers to a location that is downstream in relation to a detected interferer signal. For example, for an interferer signal that leaks from a transmission path to a reception path, any node within the reception path is downstream of nodes within the transmission path since the interferer signal flows form the transmission path to the reception path.

Control unit 212 may be further configured to provide control signals $S_{CTRL}$ to common-mode attenuation elements 214 to control adjustments to the one or more properties of the detected common-mode interferer signal $CM_{INT}$. In some embodiments, one or more common-mode attenuation elements 214 are located within a feed-forward path. The feed-forward path may extend from a location upstream of tunable amplifying stage 210 to the output of tunable amplifying stage 210.

It will be appreciated that RF second-order intermodulation distortion within the reception path may be mitigated using one or both of the disclosed apparatus (e.g., tunable amplifying stage 210 or common-mode attenuation elements 214) depending on which RF second-order intermodulation generation mechanism dominates in a given transceiver design. For example, in some embodiments a transceiver system may comprise a tunable amplifying stage 210 but not common-mode attenuation elements 214. In other embodiments, a transceiver system may comprise one or more common-mode attenuation elements 214 but not a tunable amplifying stage 210.

For successful application of the proposed RF second-order intermodulation distortion reduction techniques, specific amounts/values of intentional mismatch and/or common-mode signal injection have to be determined. In some embodiments, a calibration element 216 may be configured to enable a calibration procedure that determines the specific amounts/values of intentional mismatch and/or common-mode signal injection. For example, calibration element 216 may be configured to provide test signals to one or more nodes in the front-end of transceiver system 200. Calibration element 216 then measures one or more parameters indicative of RF second-order intermodulation distortion caused by the test signal within the reception path, and adjusts settings of the common-mode attenuation elements 214 and/or tunable amplifying stage 210 to successfully reduce RF second-order intermodulation distortion.

In various embodiments, the calibration procedures may be done with a calibration element 216 comprising an external test source (i.e., as a "factory calibration") or with a calibration element 216 comprising an internal test source (i.e., as a "field calibration"). Since the common-mode signal levels are determined to a large extent by passive external devices of the RF engine, using an external test source allows for the calibration task to be carried out based upon those devices.

For example, since RF second-order intermodulation distortion is largely introduced by the duplexer, the specifications of the duplexer may be used to properly determine how much the duplexer contributes to the generation of the unwanted common-mode signal, thereby effectively backing out the effect of the duplexer from the differential input signal. Furthermore, the use of an internal test source allows for the transceiver system to perform calibration dynamically during operation of the transceiver system, thereby allowing the system to account for changes that occur during operation. Exemplary calibration techniques are described in more detail below in exemplary methods 900 and 1000.

It will be appreciated that by reducing second-order intermodulation distortion that results from a transmitted signal leaking into the reception path, the disclosed apparatus and techniques allow for duplexers having a relatively low isolation to be used, thereby reducing the cost of the transceiver system. In some embodiments, the disclosed second-order intermodulation cancellation apparatus and techniques can sufficiently reduce second-order intermodulation distortion so as to provide a transceiver system that does not have a duplexer configured between the reception path and a transmitter path.

Figure 3:
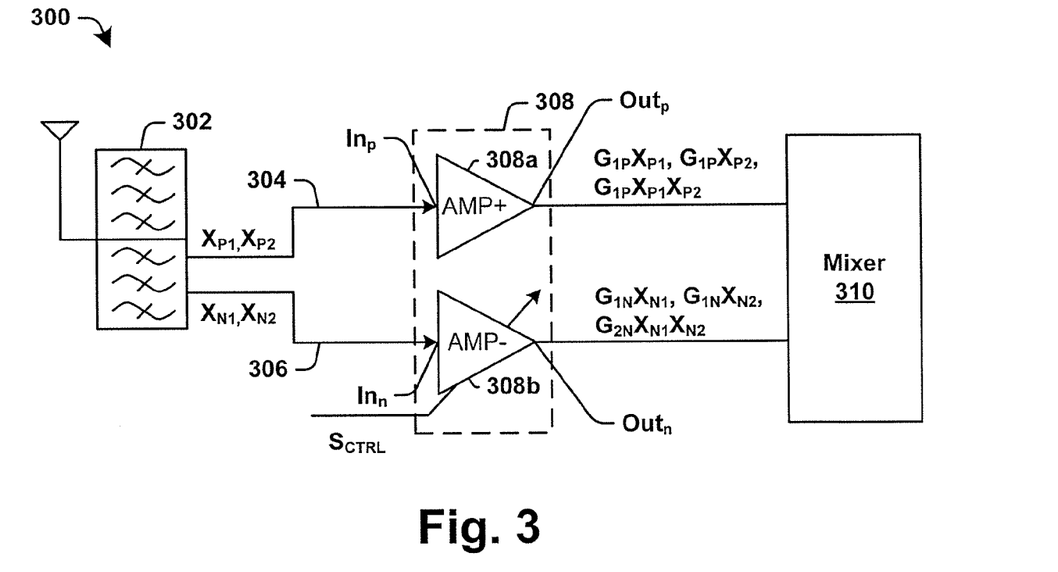
FIG. 3 illustrates a block diagram of an exemplary transceiver system comprising a tunable amplifying stage having one or more amplifier elements configured to introduce operating parameter mismatches between differential branches of a reception path.

FIG. 3 illustrates an exemplary block diagram of a transceiver front-end 300 having a differential reception path comprising a tunable amplifying stage 308, as disclosed herein. Tunable amplifying stage 308 is configured to implement intentional gain coefficient mismatching between amplifier elements operating in separate differential branches to account for amplifier device mismatches. The intentional gain coefficient mismatching reduces RF second-order intermodulation distortion within the differential reception path.

In particular, a duplexer 302 is connected to a differential reception path configured to conduct a differential input signal. When interferer signals, present in duplexer 302, are passed through a nonlinear amplifying stage 308 an RF second-order intermodulation distortion appears in the differential reception path.

The differential reception path has a first differential branch 304 and a second differential branch 306. First differential branch 304 is connected to a first input node $In_p$ of a first amplifier element 308a and second differential branch 306 is connected to a second input node $In_n$ of a second amplifier element 308b. First and second differential branches 304 and 306 are configured to respectively transmit a differential N-P complementary input signal from duplexer 302 to first and second amplifier elements 308a and 308b.

First amplifier element 308a is configured to receive first input signal components $X_{P1}$ and $X_{P2}$ at first input terminal $In_p$. First amplifier element 308a operates upon first input signal components $X_{P1}$ and $X_{P2}$ to output a first order product, comprising a first order gain coefficient $g_{1P}$ multiplied by first input signal components $X_{P1}$ or $X_{P2}$ (e.g., $G_{1P}X_{P1}$ or $G_{1P}X_{P2}$), at a first output terminal $Out_P$. First output terminal $Out_P$ also outputs a second order product comprising a second order gain coefficient $g_{2P}$ multiplied by a mixture of first input signal components $X_{P1}$ and $X_{P2}$ (e.g., $G_{2P}X_{P1}X_{P2}$).

Second amplifier element 308b is configured to receive second input signal components $X_{N1}$ and $X_{N2}$ at second input terminal $In_n$. Second amplifier element 308b operates upon second input signal components $X_{N1}$ and $X_{N2}$ to output a first order product, comprising a first order gain coefficient $g_{1N}$ multiplied by second input signal components $X_{N1}$ or $X_{N2}$ (e.g., $G_{1N}X_{N1}$ or $G_{1N}N_{N2}$) at a second output terminal $Out_n$. Second output terminal $Out_n$ also outputs a second order product comprising a second order gain coefficient $g_{2N}$ multiplied by a mixture of second input signal components $X_{N1}$ and $N_{x2}$ (e.g., $G_{2N}X_{N1}X_{N2}$).

By expressing first and second input signal components, $X_P$ and $X_N$, in terms of their common-mode components $X_{CM}$ and differential components $X_{diff}$, $$X_P = X_{CM} + X_{diff}/2 \tag{1}$$

$$X_N = X_{CM} - X_{diff}/2, \tag{2}$$

a differential output second-order intermodulation signal $Y_{IMD2,DIFF}$ may be expressed as:

$$Y_{IMD2,DIFF} = g_{2P}X_{P1}X_{P2} - g_{2N}X_{N1}X_{N2}. \tag{3}$$

wherein the single-sided second-order gain coefficients, $g_{2P}$ and $g_{2N}$, may be written as:

$$g_{2P} = g_2(1+\Delta g_2) \tag{4a}$$

$$g_{2N} = g_2(1-\Delta g_2) \tag{4b}$$

where $\Delta g2$ is a relative mismatch factor of the second-order gain coefficient, defined as $\Delta g_2 = (g_{2P}-g_{2N})/(g_{2P}+g_{2N})$. Based upon these definitions, the second-order differential distortion signal $Y_{IMD2,DIFF}$ may be written in terms of circuit parameters, as:

$$Y_{IMD2,DIFF} = g_2[X_{CM1}X_{diff2} + X_{CM2}X_{diff1} + 2\Delta g_2 (X_{CM1}X_{CM2}(X_{diff1} + X_{diff2})/4)] \quad (5)$$

wherein $X_{CM1}$ is the common-mode signal at a first frequency and $X_{CM2}$ is the common-mode signal at a second frequency. The resulting RF second-order differential distortion signal $Y_{IMD2,DIFF}$ has three components. The first two components are the cross products of the common-mode signals $X_{CMx}$ and the differential signals $X_{diffx}$ of the input interferer signals. The third term depends on mismatches between second-order gain coefficients $\Delta g_2$ of the amplifying devices.

By intentionally mismatching gain coefficients of first and second amplifier elements 308a and 308b the differences in the nonlinear responses between first and second amplifier elements 308a and 308b may be removed. Removing differences in the nonlinear responses causes the relative mismatch factor of second-order gain coefficient $\Delta g2$ to go to zero, thereby reducing second-order differential distortion within the reception path by causing the third term of second-order differential distortion signal $Y_{IMD2,DIFF}$ to disappear.

One of ordinary skill in the art will appreciate that the gain of a transistor device is a function of the transistor width to channel length ratio, such that increasing the channel width increases the gain of the device. Therefore, in some embodiments, the intentional gain coefficient mismatching of amplifier elements 308a and 308b may be performed by adjusting the effective widths of transistor devices within first or second amplifier elements 308a and 308b in an unequal manner. For example, the effective width of transistor devices may be changed in one of amplifier elements 308a and 308b without changing the effective width of transistor devices in the other one of amplifier elements 308a and 308b. It will be appreciated that the term "effective width" as applied herein refers to the cumulative width of transistor devices within an amplifier element. For example, since amplifiers typically comprise a plurality of transistor devices, the effective widths of transistor devices may be adjusted by adjusting the number of transistor devices that are turned on in an amplifier element.

In some embodiments, the existing circuitry used to change the effective width of transistor devices may be reused for intentionally mismatching gain coefficients of amplifier elements 308a and 308b. For example, in certain applications wherein device widths are modified to compensate for process and temperature variations, existing circuitry (e.g., switches, digital logic) may be reused to a large extent for intentionally mismatching of amplifier elements 308a and 308b.

Figure 4:
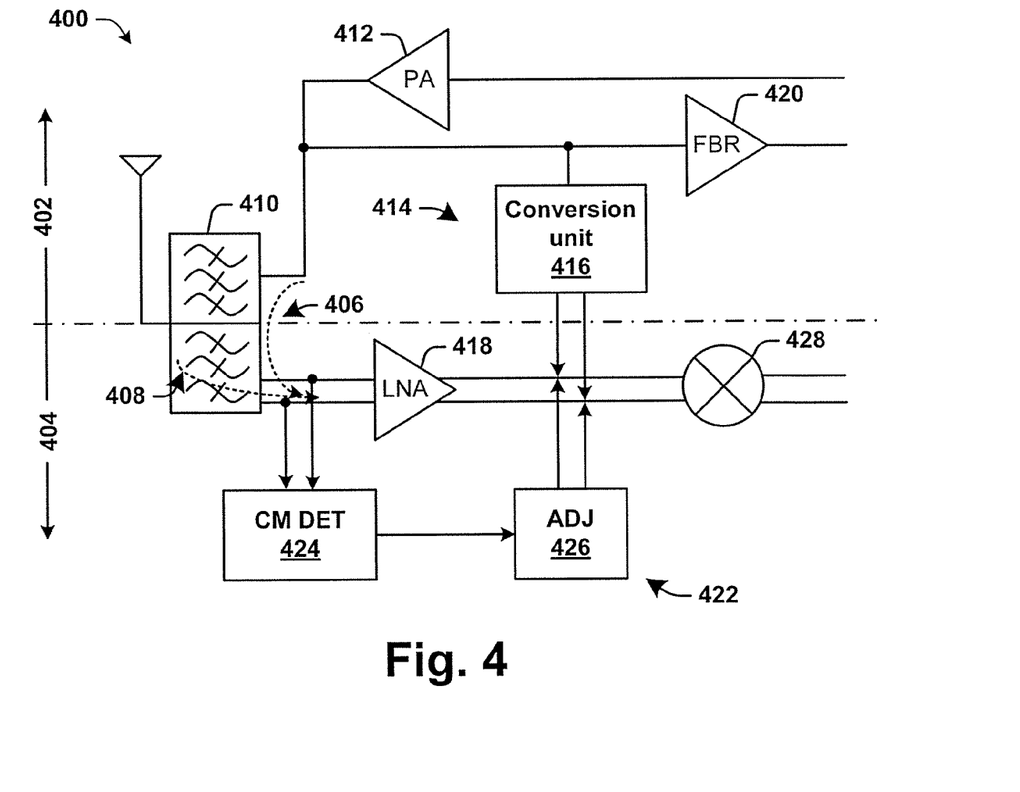
FIG. 4 illustrates a block diagram of an exemplary transceiver system comprising one or more common-mode attenuation elements configured to attenuate common-mode interferer signals within a reception path.

FIG. 4 illustrates a block diagram of a front end of an exemplary transceiver circuit 400 configured to attenuate common-mode interferer signals. Transceiver circuit 400 comprises one or more common-mode attenuation elements configured to detect the common-mode of interferer signals, to adjust one or more parameters of the detected common-mode signals (e.g., amplitude, phase, delay, etc.), and then to feed the adjusted common-mode signal back into the reception path to cancel the common-mode interferer signals. By attenuating the common-mode interferer signals without adjusting the differential input signals, second order intermodulation noise is reduced without substantially deteriorating the differential input signals received by the antenna.

It will be appreciated that since the interferers may be separated from one another by a large frequency range (e.g., hundreds of MHz), transceiver circuit 400 may be configured to independently detect and adjust different common-mode interferer signals. In some embodiments, transceiver circuit 400 may comprise a first common-mode attenuation element 414 configured to attenuate common-mode interferers at a first frequency and a second common-mode attenuation element 422 configured to attenuate common-mode interferers at a second frequency.

For example, if transceiver circuit 400 is operated in full-duplex mode a first interferer signal 406 is generated from the transmitted signal in a transmitter section 402 leaking through duplexer 410 into a reception path of a receiver section 404. First interferer signal 406 may be attenuated by first common-mode attenuation element 414 connected between transmitter section 402 and receiver section 404. As illustrated in FIG. 4, first common-mode attenuation element 414 may comprise a conversion unit 416 configured to receive a single ended TX signal from a power amplifier 412. Conversion unit 416 converts the single ended signal TX signal to a common-mode signal and detects the common-mode of first interferer signal 406 therefrom. Conversion unit 416 is also configured to adjust properties of the detected common-mode signal. The adjusted common-mode signal is then injected into the reception path at a location downstream of a low noise amplifier (LNA) 418. The adjusted common-mode signal attenuates RF second-order intermodulation distortion within receiver section 404 (i.e., makes $X_{CM1}X_{diff2}$ approximately zero).

In various embodiments, conversion unit 416 may adjust properties including but not limited to the phase, magnitude, and/or signal delay of the detected common-mode of the first interferer signal. For example, in some embodiments, conversion unit 416 is configured to add a phase offset of 180° to the detected common-mode signal. The 180° phase offset causes the sign of the detected common-mode signal to change so that when the adjusted common-mode signal is reinserted into the reception path, the common-mode signal component ($X_{CM1}$) is minimized (e.g., set to approximately zero). In some embodiments, a feedback receiver (FBR) input 420 may be used in power amplifier linearization systems as a reference node.

Transceiver circuit 400 may additionally or alternatively have a second common-mode attenuation element 422 comprising a feed-forward path configured to attenuate a second interferer signal 408. The feed-forward common-mode signal path extends from an input of low noise amplifier (LNA) 418 to an output of LNA 418. The feed-forward path comprises a common-mode detection element 424 and a common-mode adjustment element 426.

Second common-mode detection element 418 is configured to detect the common-mode of second interferer signal 408 in the reception path. Common-mode detection element 424 then outputs the detected common-mode signal to common-mode adjustment element 426. Common-mode adjustment element 426 is configured to make adjustments to properties of the detected common-mode signal independent from the common-mode signal detected in the transmitter section 402 (which may contain common-mode components at different frequencies). The adjusted properties may include but are not limited to the phase and/or magnitude of the detected common-mode signal of second interferer signal 408. The adjusted common-mode signal is then output into the reception path, attenuating RF second-order intermodulation distortion within receiver section 404 (i.e., making $X_{CM2}X_{diff1}$ approximately zero).

Accordingly, by utilizing two separate common-mode attenuation elements 414 and 422, the common-mode of multiple interferer signals (e.g., 406 and 408) may be effectively reduced. This reduces RF second-order differential distortion within the reception path by causing the first and second terms ($X_{CM1}X_{diff2}$ and $X_{CM2}X_{diff1}$) of the second order differential distortion signal $Y_{IMD2,DIFF}$ to disappear.

Figure 5A:
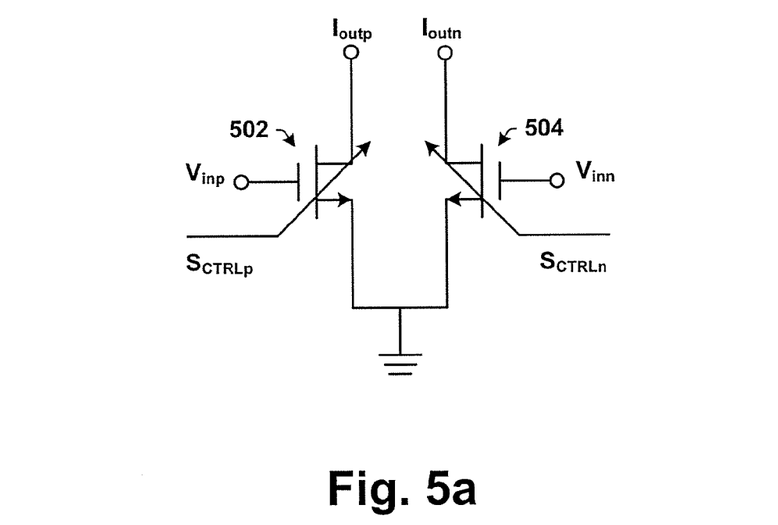
FIGS. 5a-5b illustrate schematic diagrams of an exemplary tunable amplifying stage comprising one or more amplifier elements, as provided herein.

FIG. 5a illustrates a schematic diagram of a tunable differential amplifying stage 500 comprising two amplifier elements, 502 and 504, configured to operate as transconductors (e.g., having a transconductance gm). The effective width of one or more of amplifier elements 502 and 504 may be dynamically adjusted by one or more control signals to induce transistor device gain coefficient mismatches between amplifier elements 502 and 504. As shown in FIG. 5a, first amplifier element 502 is configured to receive a first control signal $S_{CTRLp}$ and second amplifier element 504 is configured to receive a second control signal $S_{CTRLn}$, which is independent of the first control signal $S_{CTRLp}$. Tunable differential amplifying stage 500 amplifies received differential input voltages $V_{inp}$ and $V_{inn}$, based upon control signals $S_{CTRLp}$ and $S_{CTRLn}$ to generate differential output currents $I_{outp}$ and $I_{outn}$.

Figure 5B:
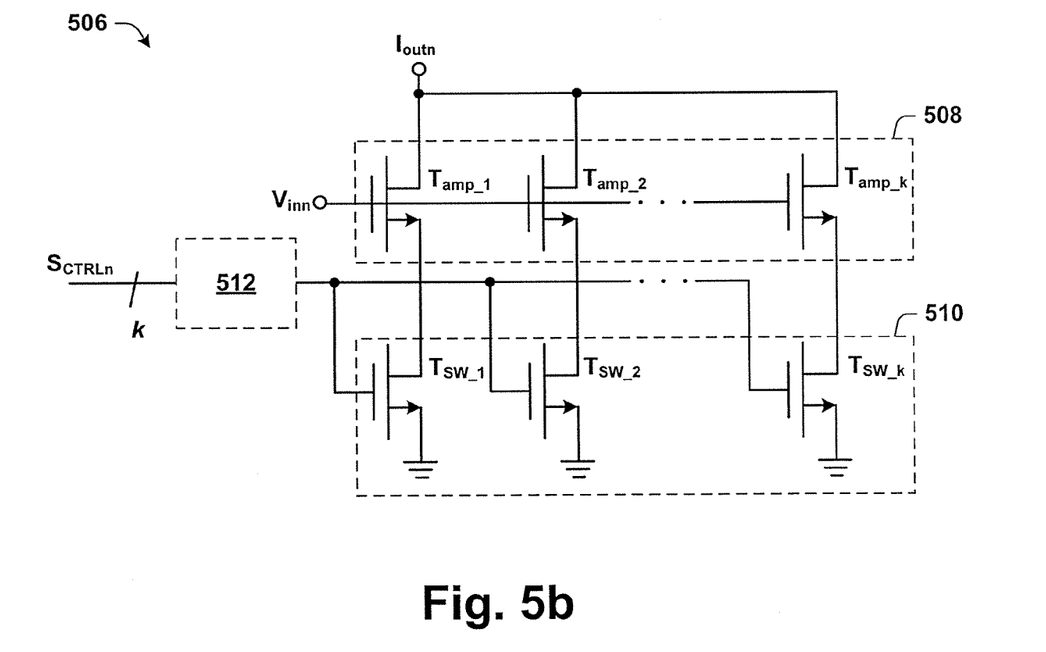

FIG. 5b illustrates a circuit diagram 506 of an exemplary implementation of amplifier element 504 shown in FIG. 5a. Circuit diagram 506 comprises a plurality of amplifying transistor devices 508 and a plurality of switching transistor devices 510. Amplifying transistor devices 508 have gates connected to a node providing an input voltage $V_{inn}$, and drains connected to a node providing an output current $I_{outn}$. Switching transistor devices 510 have a drain connected to a source of an associated amplifying transistor device, a source connected to ground, and a gate connected to a control word $S_{CTRLn}$. The control word $S_{CTRLx}$ selectively activates switching transistor devices 510 to compensate for gain coefficient mismatches between amplifier elements 502 and 504. For example, when a switching transistor device (e.g., $T_{SW\_1}$, $T_{SW\_2}$, etc.) is turned on, its drain becomes connected to ground increasing the $V_{GS}$ and accordingly the current output from an associated amplifying transistor (since $I_d = K \cdot (W/L) \cdot (V_{GS} - V_{th})^2$). When the switching transistor is turned off, $V_{GS}$ of the amplifying transistor is decreased and the current output from the amplifying transistor is reduced.

Therefore, if the control word $S_{CTRLn}$ turns on transistor devices $T_{SW\_1}$ and $T_{SW\_2}$, the amplifier element 504 will have an effective width that results in a first gain coefficient and a first output current value. However, if control word $S_{CTRLn}$ only turns on transistor device $T_{SW\_1}$, the amplifier element 504 will have a smaller effective width that results in a second gain coefficient and a second output current value, which are respectively smaller than the first gain coefficient and the first output current value.

In some embodiments, the first and second control signals, $S_{CTRLp}$ and $S_{CTRLn}$, may comprise tuning codes having a control-voltage, bit streaming, or control word, for example. In one embodiment, a control signal $S_{CRTL}$ comprising a digital control word having a plurality of k data bits is provided to a selection circuit 512. Based upon values of the plurality of k data bits in the received control word, the selection circuit 512 sends an activation voltage to selected switching transistor device gates, causing the selected switching transistor devices to turn on and thereby increase the effective width of the amplifier element 504. In some embodiments, the mean value of tuning codes provided to amplifier elements 502 and 504 may be determined by a transconductance alignment algorithm, wherein their difference is set in order to balance second-order transconductances.

Figure 6:
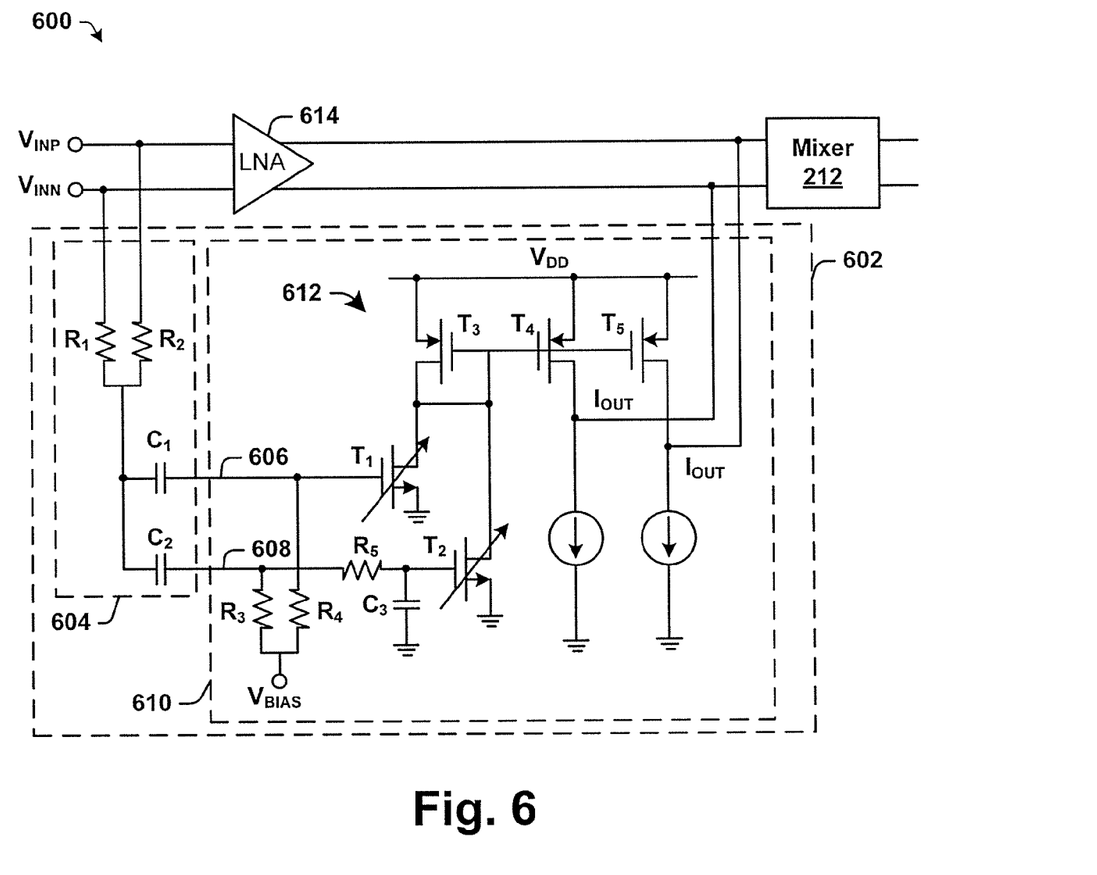
FIG. 6 illustrates a schematic diagram of an exemplary common-mode attenuation element.

FIG. 6 illustrates a schematic diagram of a transceiver circuit 600 comprising a common-mode attenuation element. The common mode attenuation element 602 comprises a common mode detection element 604 and an adjustment element 610.

Common-mode detection element 604 is configured to detect a common-mode voltage signal at the input of low-noise amplifier (LNA) 614 by using two matched resistors $R_1$ and $R_2$. The detected common-mode voltage signal is sent to paths 606 and 608, respectively comprising filter capacitors $C_1$ and $C_2$ which pass RF signals and that block DC signals, which provides the signals to adjustment element 610.

Adjustment element 610 comprises a biasing voltage $V_{bias}$ that is added to the detected common-mode voltage signal of paths 606 and 608. The biasing voltage $V_{bias}$ activates the gates of single-ended amplifiers based around transistors $T_1$ and $T_2$. The gains of amplifying transistors $T_1$ and $T_2$ can be scaled to vary the output signal. Path 608 further comprises a passive RC-filter, comprising resistor $R_5$ and capacitor $C_3$, which introduces certain phase shift into the detected common-mode voltage signal.

The output of transistors $T_1$ and $T_2$ is added to provide a current having a certain phase and magnitude, which is copied by current mirror 612, comprising transistors $T_3$-$T_5$, to generate common-mode output signal that is injected into the reception path. Current mirror 612 is configured to generate the common-mode output signal as a function of the detected common-mode voltage signal, so that the common mode output signal compensates for the common-mode of an interferer signal in the reception path (e.g., taking into account the behavior of LNA 614).

Figure 7:
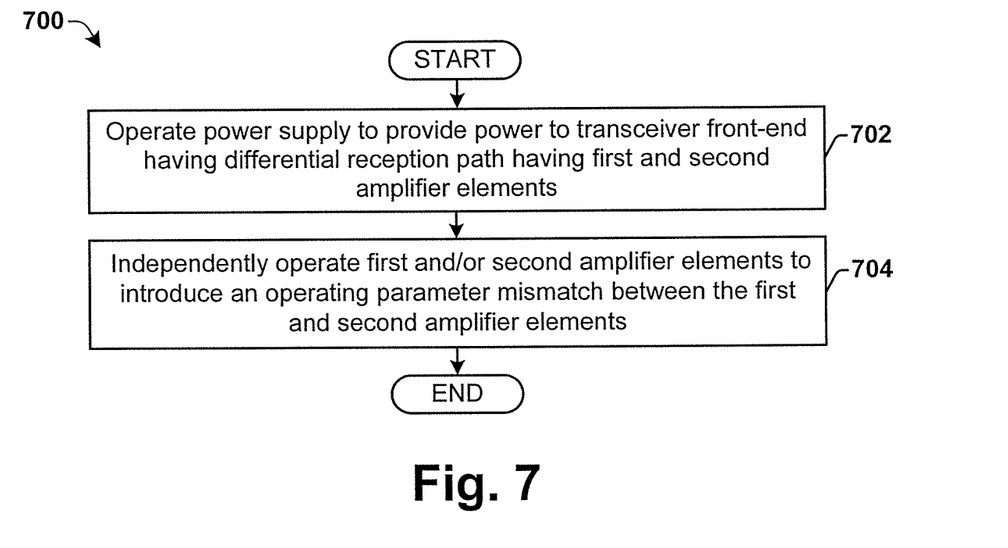
FIG. 7 is a flow diagram of an exemplary method of reducing RF second-order intermodulation distortion by intentionally generating operating parameter mismatches between differential branches of a reception path.

FIG. 7 is a flow diagram of an exemplary method 700 of reducing RF second-order intermodulation distortion by intentionally generating operating parameter mismatches between differential branches of a reception path.

It will be appreciated that while the methods disclosed herein (e.g., methods 700, 800, 900, and 1000) are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Furthermore, the disclosed methods may be implemented as a apparatus, or article of manufacture using standard programming and/or engineering techniques to produce software, firmware, hardware, or any combination thereof to control a computer to implement the disclosed subject matter (e.g., the circuits shown in FIGS. 2, 3, 4, etc., are non-limiting examples of circuits that may be used to implement the disclosed methods). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

At 702 a differential reception path having a tunable amplifying stage is provided. The tunable amplifying stage comprises a first amplifier element within a first differential branch and a second amplifier element within a second differential branch. The differential reception path is configured to convey a differential input signal having an RF second-order intermodulation distortion.

At 704 the first and/or second amplifier elements are independently operated to introduce an operating parameter mismatch between the first and second amplifier elements. The operating parameter mismatch is chosen to have a specific value that mitigates the RF second-order intermodulation distortion within the differential reception path. In some embodiments, the operating parameter mismatch comprises a mismatch of gain coefficients of the amplifier elements. In such an embodiment, the effective widths of the first and/or second amplifier elements may be dynamically adjusted. In some embodiments, a processor (e.g., processor 1102 in FIG. 11) may execute instructions stored in a memory (e.g., memory 1104 in FIG. 11) to operate the first and/or second amplifier elements to introduce the operating parameter mismatch.

Figure 8:
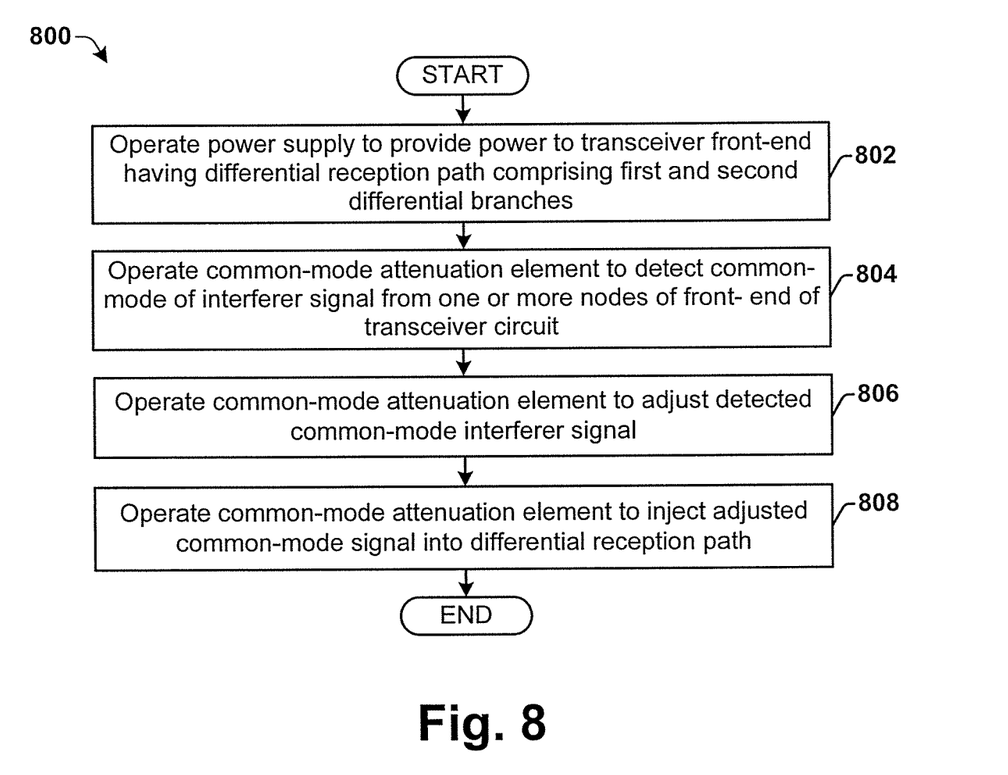
FIG. 8 illustrates a flow diagram of another exemplary method of reducing RF second-order intermodulation distortion by attenuating common-mode interferer signals within a reception path.

FIG. 8 illustrates a flow diagram of another exemplary method 800 of reducing second order intermodulation distortion by attenuating common-mode interferer signals within a reception path. It will be appreciated that in some embodiments, a processor (e.g., processor 1102 in FIG. 11) may execute instructions stored in a memory (e.g., memory 1104 in FIG. 11) to operate the common-mode attenuation element as provided in method 800.

At 802 a power supply is operated to provide power to a transceiver front-end having a differential reception path comprising a first amplifier element within a first differential branch and a second amplifier element within a second differential branch configured to convey a differential input signal having second order intermodulation distortion.

At 804 a common-mode attenuation element is operated to detect a common-mode of an interferer signal from one or more nodes in the front end of a transceiver circuit. In some embodiments, the one or more nodes may comprise a first node within a transmission path of the transceiver circuit and a second node within a reception path of the transceiver circuit.

At 806 the common-mode attenuation element is operated to adjust one or more properties of the detected common-mode interferer signal. Adjusting the detected common-mode signal may comprise adjusting the magnitude and/or phase and/or introducing a signal delay into the detected common-mode signal. In some embodiments, the detected common-mode signal is adjusted to switch the sign of its magnitude.

At 808 the common-mode attenuation element is operated to inject the adjusted common-mode signal into the differential reception path. The injected adjusted common-mode signal attenuates the common-mode interferer signal detected at the one or more nodes, thereby decreasing second order intermodulation distortion within the reception path.

Figure 9:
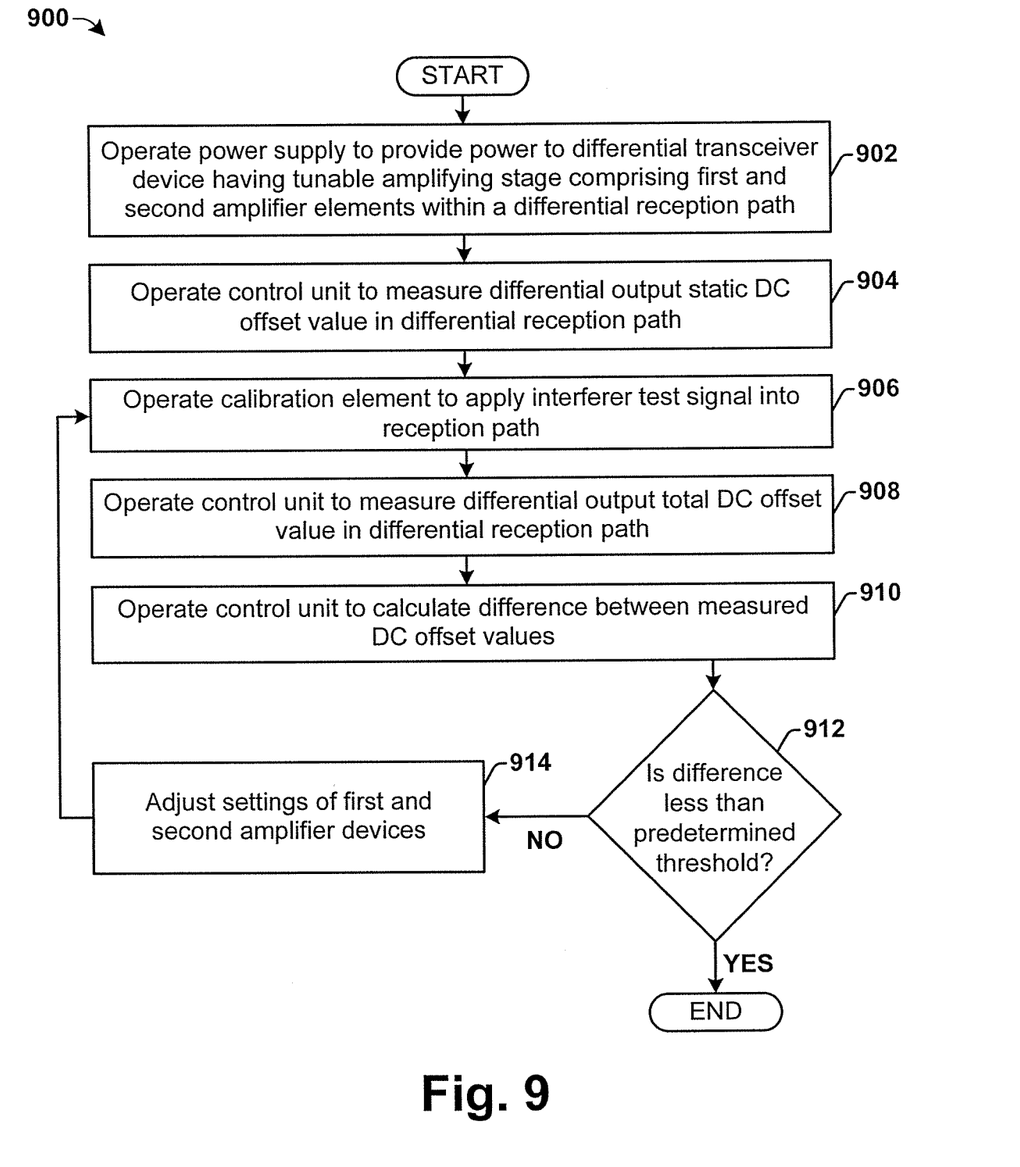
FIG. 9 is a flow diagram of an exemplary method for calibrating operating parameter mismatches between differential branches of a reception path.

FIG. 9 is a flow diagram of an exemplary method 900 of calibrating operating parameter mismatches between differential branches of a reception path. The method 900 of calibration operates by locally injecting common-mode test tones and detecting resulting differential output signals. It will be appreciated that in some embodiments, a processor (e.g., processor 1102 in FIG. 11) may execute instructions stored in a memory (e.g., memory 1104 in FIG. 11) to operate the control unit and/or calibration element as provided in method 900.

At 902 a power supply is operated to provide power to a differential transceiver device having a tunable amplifying stage comprising first and second amplifier elements within a differential reception path. In particular, the provided power turns on the differential transceiver device, which has a tunable nonlinear amplifying stage having a first amplifier element within a first differential branch and a second amplifier element within a second differential branch.

At 904 a control unit is operated to measure a differential output static DC offset value in the differential reception path. The differential output static DC offset value is a DC offset measured between differential branches of a differential reception path.

At 906 a calibration element is operated to apply an interferer test signal to the reception path. In some embodiments, the interferer test signal comprises an amplitude modulated wave (e.g., having a square waveform at some intermediate frequency). The interferer test signal may be injected in front of the nonlinear amplifying stage.

At 908 the control unit is operated to measure a differential output total DC offset value in the differential reception path. The differential output total DC offset value comprises contributions from both the differential output static DC offset and the interferer test signal.

At 910 the control unit is operated to calculate the difference between the measured differential output static DC offset value and the measured differential output total DC offset value. The difference between the static and total DC offset values is indicative of device mismatches between the amplifier elements.

The control unit is operated to compare the calculated difference to a predetermined threshold value at 912. If the calculated difference is less than the predetermined threshold value, method 900 ends. However, if the calculated difference is greater than the predetermined threshold value then the control unit adjusts settings (e.g., gain) of one or more transceiver amplifier elements to change the operating parameter mismatch at 914.

Figure 10:
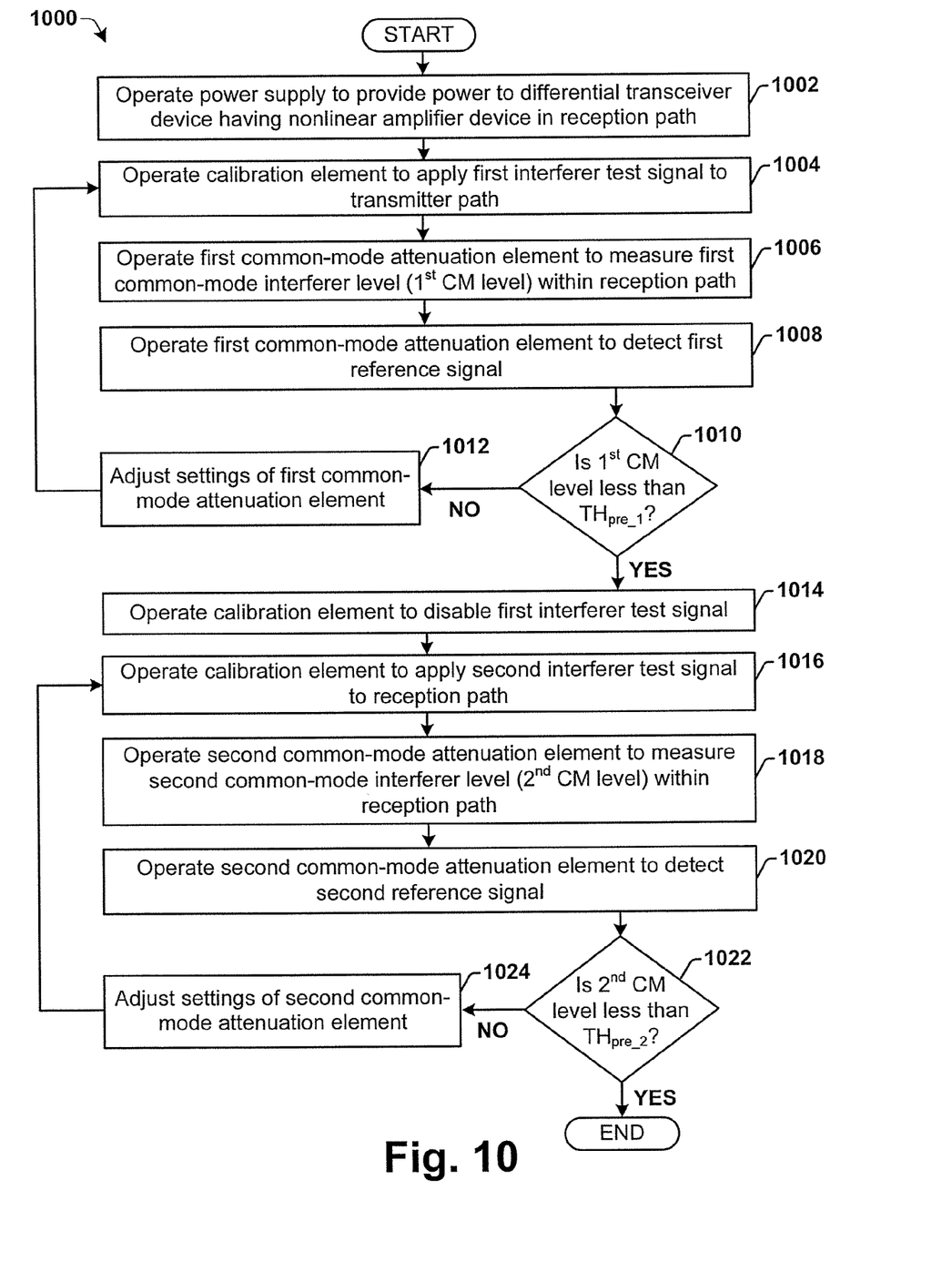
FIG. 10 illustrates a flow diagram of an exemplary method for calibrating attenuation of common-mode interferer signals within a reception path.

FIG. 10 illustrates a flow diagram of another exemplary method 1000 of calibrating attenuation of common-mode interferer signals within a reception path. The method 1000 of calibration may require the injection of test signals at an antenna port and at a transmission path. It will be appreciated that although method 1000 describes calibration of first and second common-mode attenuation elements, the method is not limited to calibration of two common-mode attenuation elements. Rather, one or more steps of the disclosed method 1000 may be utilized to calibrate any number of common-mode attenuation elements. Furthermore, it will be appreciated that in some embodiments, a processor (e.g., processor 1102 in FIG. 11) may execute instructions stored in a memory (e.g., memory 1104 in FIG. 11) to operate the common-mode attenuation elements and/or calibration element as provided in method 1000.

At 1002 a power supply is operated to provide power to a differential transceiver device having a nonlinear amplifying stage within a differential reception path. The provided power turns on a differential transceiver device. In some embodiments, the amplifying stage may comprise a low noise amplifier (LNA).

At 1004 a calibration element is operated to apply a first interferer test signal to a transmitter path of the transceiver device. The first interferer test signal leaks into the differential reception path where it has some common-mode components and some differential-mode components.

At 1006 a first common-mode attenuation element is operated to measure a first common-mode interferer signal level within the reception path. For example, the first common-mode interferer signal level can be measured at the output of the LNA.

At 1008 the first common-mode attenuation element is operated to detect a first reference signal at a first node within the transmitter path.

At 1010 the first common-mode attenuation element is operated to compare the measured first common-mode interferer signal level to a first predetermined threshold value ($TH_{pre\_1}$). Comparison of the measured first common-mode interferer signal to the first predetermined threshold value allows for changes in the common-mode attenuation element to be made to so that the reference signal is as similar as possible to the common mode level, but with opposite sign (so that the sum of both signals is minimized).

For example, if the measured first common-mode signal level is greater than the first predetermined threshold value then settings of the first common-mode attenuation element are adjusted, to adjust one or more properties (e.g., phase, magnitude, and/or signal delay) of the first reference signal at 1012. If the measured first common-mode signal level is less than the first predetermined threshold value then the calibration element is operated to disable the first interferer test signal at 1014.

At 1016 the calibration element is operated to provide a second interferer test signal is applied to a reception path of the transceiver device. The second interferer test signal may be applied to an antenna port of the transceiver, for example.

At 1018 a second common-mode attenuation element is operated to measure a second common-mode interferer signal level within the reception path. The second common-mode interferer signal level can be measured at the output of the LNA.

At 1020 a second common-mode attenuation element is operated to detect a second reference signal at one or more nodes within the reception path.

At 1022 the second common-mode attenuation element is operated to compare the measured second common-mode signal level to a second predetermined threshold value ($TH_{pre\_2}$). If the measured second common-mode signal level is less than the second predetermined threshold value method 1000 ends. However, if the measured second common-mode signal level is greater than the second predetermined threshold value then settings of the second common-mode attenuation element are adjusted, to adjust one or more properties of the second reference signal at 1024. In various embodiments, the properties may comprise the phase, magnitude and/or signal delay of the detected common-mode of the second interferer signal.

Figure 11:
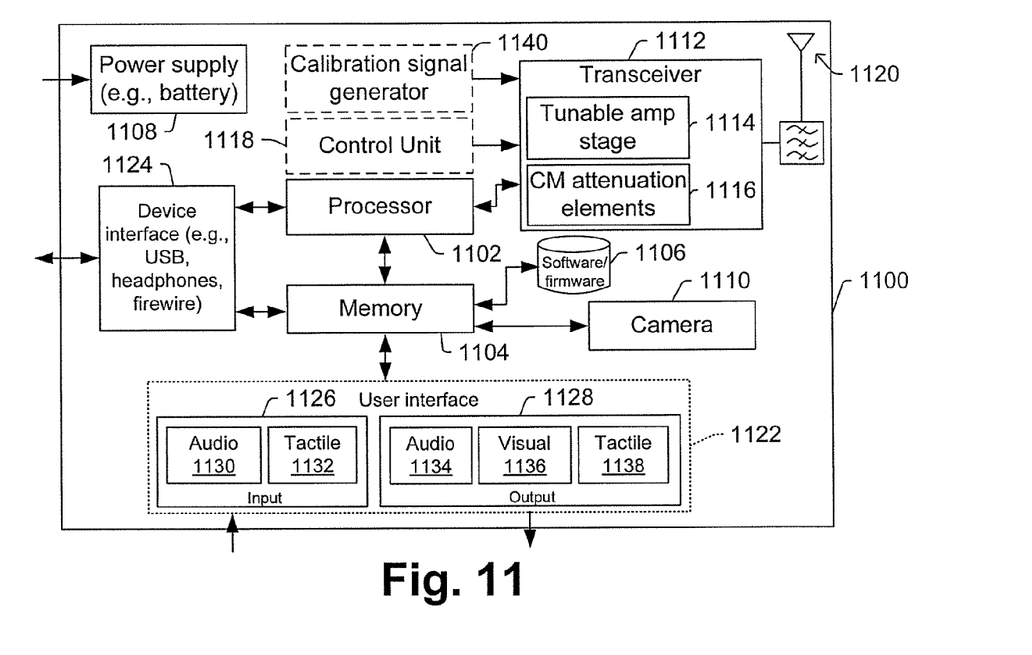
FIG. 11 illustrates an example of a mobile communication device, such as a mobile handset, in accordance with the disclosure.

FIG. 11 and the following discussion provide a brief, general description of a suitable mobile communication device 1100 to implement embodiments of one or more of the provisions set forth herein. This mobile communication device 1100 is merely one possible device on which second order intermodulation noise attenuation techniques as set forth above may be implemented, and it will be appreciated that the noise attenuation techniques may also be used with other devices (e.g., individual digital chip sets, mixed-signal chip sets, and/or analog chip sets). Therefore, the mobile communication device 1100 of FIG. 11 is only one example of a suitable operating environment and is not intended to suggest any limitation as to the scope of use or functionality of the operating environment. Example mobile communication devices include, but are not limited to, mobile devices (such as mobile phones, Personal Digital Assistants (PDAs), media players, and the like), tablets, personal computers, server computers, hand-held or laptop devices, multiprocessor systems, consumer electronics, mini computers, mainframe computers, distributed computing environments that include any of the above systems or devices, and the like.

FIG. 11 illustrates an example of a mobile communication device 1100, such as a mobile phone handset for example, configured to implement one or more embodiments provided herein. In one configuration, mobile communication device 1100 includes at least one processing unit 1102 and memory 1104. Depending on the exact configuration and type of mobile communication device, memory 1104 may be volatile (such as RAM, for example), non-volatile (such as ROM, flash memory, etc., for example) or some combination of the two. Memory 1104 may be removable and/or non-removable, and may also include, but is not limited to, magnetic storage, optical storage, and the like. In some embodiments, computer readable instructions in the form of software or firmware 1106 to implement one or more embodiments provided herein may be stored in memory 1104. Memory 1104 may also store other computer readable instructions to implement an operating system, an application program, and the like. Computer readable instructions may be loaded in memory 1104 for execution by processing unit 1102, for example. Other peripherals, such as a power supply 1108 (e.g., battery) and a camera 1110 may also be present.

Processing unit 1102 and memory 1104 work in coordinated fashion along with a transceiver 1112 to wirelessly communicate with other devices by way of a wireless communication signal. To facilitate this wireless communication, a wireless antenna 1120 is coupled to transceiver 1112. During wireless communication, transceiver 1112 may use frequency modulation, amplitude modulation, phase modulation, and/or combinations thereof to communicate signals to another wireless device, such as a base station for example. The previously described high resolution phase alignment techniques are often implemented in processing unit 1102 and/or transceiver 1112 (possibly in conjunction with memory 1104 and software/firmware 1106) to facilitate accurate data communication. However, the high resolution phase alignment techniques could also be used in other parts of mobile communication device.

To reduce second-order intermodulation noise within transceiver 1112, the mobile communication device 1100 also may include a tunable amplifying stage 1114 and/or one or more common-mode attenuation elements 1116 as previously described. The tunable amplifying stage 1114 and/or one or more common-mode attenuation elements 1116 are configured to cancel RF second-order intermodulation distortion arising from the mechanisms herein identified that contribute to RF second-order intermodulation distortion in differential transceiver systems. A control unit 1118 is configured to send control signals to tunable amplifying stage 1114 and/or common-mode attenuation elements 1116. In some embodiments, processing unit 1102 comprise control unit 1118.

To improve a user's interaction with the mobile communication device 1100, the mobile communication device 1100 may also include a number of interfaces that allow the mobile communication device 1100 to exchange information with the external environment. These interfaces may include one or more user interface(s) 1122, and one or more device interface(s) 1124, among others.

If present, user interface 1122 may include any number of user inputs 1126 that allow a user to input information into the mobile communication device 1100, and may also include any number of user outputs 1128 that allow a user to receive information from the mobile communication device 1100. In some mobile phone embodiments, the user inputs 1126 may include an audio input 1130 (e.g., a microphone) and/or a tactile input 1132 (e.g., push buttons and/or a keyboard). In some mobile phone embodiments, the user outputs 1128 may include an audio output 1134 (e.g., a speaker), a visual output 1136 (e.g., an LCD or LED screen), and/or tactile output 1138 (e.g., a vibrating buzzer), among others.

Device interface 1124 allows a device such as camera 1110 to communicate with other electronic devices. Device interface 1124 may include, but is not limited to, a modem, a Network Interface Card (NIC), an integrated network interface, a radio frequency transmitter/receiver, an infrared port, a USB connection, or other interfaces for connecting mobile communication device 1100 to other mobile communication devices. Device connection(s) 1124 may include a wired connection or a wireless connection. Device connection(s) 1124 may transmit and/or receive communication media.

Mobile device 1000 may further comprise a self calibration signal generator 1140 configured to provide calibration signals to transceiver 1112. As described above, in relation to methods 900 and 1000, the calibration signals provided by self calibration signal generator 1140 may be used to tune operation of tunable amplifying stage 1114 and/or common-mode attenuation elements 1116 to enable efficient reduction of second-order intermodulation distortion.

Figure 12:
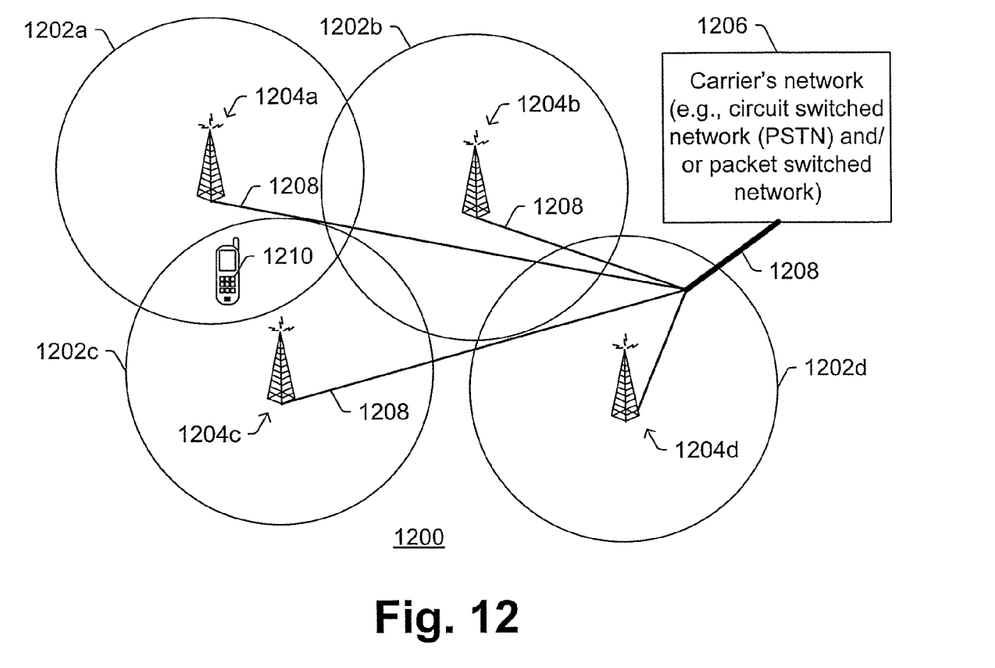
FIG. 12 illustrates an example of a wireless communication network in accordance with the disclosure.

FIG. 12 illustrates one embodiment of a wireless network 1200 over which a mobile communication device (e.g., mobile communication device 1100 in FIG. 11) in accordance with this disclosure may communicate. The wireless network 1200 is divided into a number of cells (e.g., 1202a, 1202b, ..., 1202d), wherein each cell has one or more base stations (e.g., 1204a, 1204b, ..., 1204d, respectively). Each base station may be coupled to a carrier's network 1206 (e.g., a packet switched network, or a circuit switched network such as the public switched telephone network (PSTN)) via one or more wirelines 1208.

A mobile device 1210 (e.g., mobile communication device 1100) or other mobile device, having a transceiver configured to implement an intentional gain coefficient mismatch and/or attenuation of common-mode interferer signals to reduce second-order intermodulation noise, may establish communication with the base station within that cell via one or more of frequency channels used for communication in that cell. The communication between a mobile handset or other mobile device 1210 and a corresponding base station often proceeds in accordance with an established standard communication protocol, such as LTE, GSM, CDMA or others. When a base station establishes communication with a mobile handset or other mobile device, the base station may establish communication with another external device via the carrier's network 1206, which may then route communication though the phone network.

Those skilled in the art will realize that mobile communication devices such as mobile phones may in many instances upload and download computer readable instructions from a network through the base stations. For example, a mobile handset or other mobile device 1210 accessible via network 1206 may store computer readable instructions to implement one or more embodiments provided herein. The mobile handset or other mobile device 1210 may access a network and download a part or all of the computer readable instructions for execution.

The term "computer readable media" as used herein includes computer storage media. Computer storage media includes volatile and nonvolatile, removable and non-removable media implemented in any method or technology for storage of information such as computer readable instructions or other data. Memory (e.g., 1104 in FIG. 11) is an example of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information. The term "computer readable media" may also include communication media. Communication media typically embodies computer readable instructions or other data in a "modulated data signal" such as a carrier wave or other transport component and includes any information delivery media. The term "modulated data signal" may include a signal that has one or more of its characteristics set or changed in such a manner as to encode information in the signal.

Although the disclosure has been shown and described with respect to one or more implementations, equivalent alterations and modifications will occur to others skilled in the art based upon a reading and understanding of this specification and the annexed drawings. Further, it will be appreciated that identifiers such as "first" and "second" do not imply any type of ordering or placement with respect to other elements; but rather "first" and "second" and other similar identifiers are just generic identifiers. In addition, it will be appreciated that the term "coupled" includes direct and indirect coupling. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A transceiver system, comprising:
   a differential reception path, having a first differential branch and a second differential branch, which is configured to conduct a differential input signal having RF second-order intermodulation distortion; and
   one or more common-mode attenuation elements, respectively configured to detect a common-mode interferer signal at one or more nodes within a front end of the transceiver system, to adjust one or more properties of the detected common-mode interferer signal, and to inject the adjusted common-mode interferer signal into the differential reception path;
   wherein the adjusted common-mode signal attenuates the common-mode interferer signal within the differential reception path, thereby mitigating the RF second-order intermodulation distortion.

2. The transceiver system of claim 1, further comprising:
   a duplexer configured to couple the differential reception path and a transmission path to a common antenna configured to provide the differential input signal to the reception path.

3. The transceiver system of claim 1, wherein the adjusted common-mode interferer signal is injected into the differential reception path at a location that is downstream of the one or more nodes.

4. The transceiver system of claim 1, wherein the one or more properties comprise one or more of an amplitude, a phase, and delay of the detected common-mode interferer signal.

5. The transceiver system of claim 1, wherein the one or more common-mode attenuation elements comprise:
a first common-mode attenuation element configured to detect and adjust a first common-mode interferer signal and a second common-mode attenuation element configured to independently detect and adjust a second common-mode interferer signal.

6. The transceiver system of claim 5, wherein the first common-mode attenuation element comprises:
a conversion unit located between a transmission path and the differential reception path and configured to convert a single ended transmitted signal to the first common-mode interferer signal and to make adjustments to one or more properties of the detected first common-mode interferer signal.

7. The transceiver system of claim 5, wherein the second common-mode attenuation element comprises a feed-forward path extending from a node upstream of an amplifying stage within the reception path to a node downstream of the amplifying stage, the feed-forward path comprising:
a common-mode detection element configured to detect the second common-mode interferer signal; and
an adjustment element configured to make adjustments to one or more properties of the detected second common-mode interferer signal.

8. The transceiver system of claim 1, wherein at least one of the one or more common-mode attenuation elements comprises:
a first and second resistor, respectively connected to the first and second differential branch and configured to detect a common-mode voltage signal in the differential reception path;
a phase shift element configured to introduce a phase shift into the detected common-mode voltage signal;
a first and second single-ended amplifiers configured generate a current from the phase shifted common-mode voltage signal; and
a current mirror configured to generate an adjusted common-mode signal based upon the current.

9. The transceiver system of claim 1, further comprising:
a tunable amplifying stage, located within the differential reception path, comprising a first amplifier element configured to operate upon the first differential branch and a second amplifier element configured to operate upon the second differential branch; and
a control unit configured to mitigate the RF second-order intermodulation distortion within the differential reception path by independently controlling the first or second amplifier elements to introduce an operating parameter mismatch having a specific value between the first and second amplifier elements.

10. The transceiver system of claim 1, further comprising:
a calibration element configured to enable a calibration of the one or more common-mode attenuation elements to determine a value of the adjustment made to one or more properties of the detected common-mode interferer signal.

11. A mobile handset, comprising:
a processor;
a memory;
a transceiver configured to send and receive a wireless communication signal, wherein the transceiver comprises a differential reception path having a first differential branch and a second differential branch; and
one or more common-mode attenuation elements configured to detect a common-mode interferer signal at one or more nodes within a front-end of the transceiver, to adjust one or more properties of the detected common-mode interferer signal, and to inject the adjusted common-mode interferer signal into the differential reception path at a location downstream of the one or more nodes;
wherein the adjusted common-mode signal attenuates the common-mode interferer signal within the differential reception path.

12. The mobile handset of claim 11, further comprising:
a tunable amplifying stage, located within the differential reception path, comprising a first amplifier element configured to operate upon the first differential branch and a second amplifier element configured to operate upon the second differential branch; and
a control unit configured to mitigate RF second-order intermodulation distortion within the differential reception path by independently controlling the first or second amplifier elements to introduce an operating parameter mismatch between the first and second amplifier having a specific value.

13. The mobile handset of claim 11, wherein the one or more properties comprise one or more of an amplitude, a phase, and delay of the detected interferer signal.

14. The mobile handset of claim 11, wherein the one or more common-mode attenuation elements comprise:
a first common-mode attenuation element and a second common-mode attenuation element configured to independently detect and adjust different common-mode interferer signals.

15. The mobile handset of claim 14,
wherein the first common-mode attenuation element extends between a node within a transmission path and the reception path, and
wherein the second common-mode attenuation element extends from nodes within the reception path to downstream nodes within the reception path.

16. A method for reducing second order intermodulation distortion within a receiver chain, comprising:
operating a power supply to provide power to a transceiver front-end having a differential reception path configured to convey a differential input signal having second-order intermodulation distortion;
operating a common-mode attenuation element to detect a common-mode interferer signal at one or more nodes within the transceiver front-end;
operating the common-mode attenuation element to adjust one or more properties of the detected common-mode interferer signal; and
operating the common-mode attenuation element to inject the adjusted common-mode interferer signal into the differential reception path, wherein the adjusted common-mode signal attenuates the common-mode interferer signal within the differential reception path.

17. The method of claim 16, further comprising:
operating the power supply to provide power to a tunable amplifying stage within the differential reception path comprising a first amplifier element within a first differential branch and a second amplifier element within a second differential branch; and
independently controlling the first and second amplifier elements to introduce an operating parameter mismatch between the first and second amplifier elements that mitigates RF second-order intermodulation distortion within the differential reception path.

18. The method of claim 16, wherein detecting the common-mode interferer signal comprises:

detecting a single node interferer signal from a transmitter path of the transceiver front-end; and converting the detected single node interferer signal to a common-mode signal.

19. The method of claim 16, further comprising performing a calibration of the adjustment to the common-mode interferer signal, wherein performing the calibration comprises:

operating a calibration element to apply a first interferer test signal to a transmitter path;

operating a first common-mode attenuation element to measure a first common-mode interferer signal level within the reception path operating the first common-mode attenuation element to detect a first reference signal at a node within the transmitter path; and comparing the measured first common-mode interferer signal level to a first predetermined threshold value and adjusting settings of the first common-mode attenuation element, to adjust one or more properties of the first reference signal if the measured common-mode interferer signal level is above the first predetermined threshold value.

20. The method of claim 19, wherein performing the calibration further comprises:

disabling the first interferer signal if the measured first common-mode interferer level is below the first predetermined threshold value;

operating the calibration element to apply a second interferer test signal to the reception path;

operating a second common-mode attenuation element to measure a second common-mode interferer signal level within the reception path operating the second common-mode attenuation element to detect a second reference signal at one or more nodes within the reception path; and comparing the measured second common-mode interferer signal level to a second predetermined threshold value and adjusting settings of the second common-mode attenuation element, to adjust one or more properties of the second reference signal, if the measured second common-mode interferer signal level is above the second predetermined threshold value.

* * * * *